(12) United States Patent
Liou et al.

(10) Patent No.: US 10,397,894 B2
(45) Date of Patent: Aug. 27, 2019

(54) AUTONOMOUS POSITIONING SYSTEMS (71) Applicant: CyberTAN Technology, Inc., Hsinchu (TW)

(72) Inventors: Jenn-Chorng Liou, Hsinchu (TW); Poyu Liu, Hsinchu (TW); Po-Chi Fu, Hsinchu (TW); Chung-Ho Wu, Hsinchu (TW)

(73) Assignee: CyberTAN Technology, Inc., Hsinchu (TW)

( * ) Notice: Subject to any disclaimer, the term of this patent is extended or adjusted under 35 U.S.C. 154(b) by 0 days.

(21) Appl. No.: 16/124,217

(22) Filed: Sep. 7, 2018

(65) Prior Publication Data

US 2019/0075540 A1    Mar. 7, 2019

Related U.S. Application Data

(60) Provisional application No. 62/555,065, filed on Sep. 7, 2017.

(51) Int. Cl.
*H04W 24/00* (2009.01)
*H04W 64/00* (2009.01)
(Continued)

(52) U.S. Cl.
CPC ......... *H04W 64/003* (2013.01); *G01S 5/0036* (2013.01); *G01S 5/14* (2013.01); *G01S 11/04* (2013.01); *G01S 11/06* (2013.01); *G01S 11/08* (2013.01); *H04B 17/27* (2015.01); *H04B 17/318* (2015.01); *H04W 4/80* (2018.02); *H04W 84/18* (2013.01)

(58) Field of Classification Search
CPC ....... H04W 4/02; H04W 64/00; H04W 84/12; H04W 48/08; H04W 88/06
USPC .......................... 455/465, 456.5, 466, 404.2
See application file for complete search history.

(56) References Cited

U.S. PATENT DOCUMENTS 9,204,291 B2 * 12/2015 Jackson ................. H04W 8/245
9,204,346 B1 * 12/2015 Pawar .................... H04W 24/02
(Continued)

FOREIGN PATENT DOCUMENTS

| TV | I565962 | 1/2017 |
| TW | I457585 | 10/2014 |
| TW | 201543929 A | 11/2015 |

*Primary Examiner* — Joseph Arevalo
(74) *Attorney, Agent, or Firm* — ScienBiziP, P.C.

(57) ABSTRACT

An autonomous positioning system for a mesh network, includes a mobile device receiving a first transmitting signal, a second transmitting signal and a third transmitting signal via the mesh network, obtaining a first, second, third received signal strength indicator (RSSI) corresponding to the first transmitting signal, the second transmitting signal, and the third transmitting signal; a first stationary access point transmitting the first transmitting signal via the mesh network and receives the a first, second, third received signal strength indicator (RSSI) and obtaining a position of the mobile device according to the first, second, third received signal strength indicator (RSSI); a second stationary access point transmitting the second transmitting signal via the mesh network; and a third stationary access point transmitting the third transmitting signal via the mesh network, wherein the first stationary access point receiving the second distance information and the third distance information.

7 Claims, 5 Drawing Sheets

(51) Int. Cl.
  *G01S 5/00*    (2006.01)
  *H04B 17/318*  (2015.01)
  *G01S 11/04*   (2006.01)
  *H04W 84/18*   (2009.01)
  *H04W 4/80*    (2018.01)
  *G01S 11/08*   (2006.01)
  *H04B 17/27*   (2015.01)
  *G01S 5/14*    (2006.01)
  *G01S 11/06*   (2006.01)

(56) References Cited

U.S. PATENT DOCUMENTS

| | | | | |
|---|---|---|---|---|
| 9,894,669 B2* | 2/2018 | Sevindik | ............... | H04W 72/10 |
| 2007/0178911 A1* | 8/2007 | Baumeister | ............ | G01S 1/022 |
| | | | | 455/456.1 |
| 2008/0009324 A1* | 1/2008 | Patel | ................... | H04W 48/18 |
| | | | | 455/566 |
| 2008/0052779 A1* | 2/2008 | Sinha | .................. | H04L 63/1441 |
| | | | | 726/22 |
| 2010/0265093 A1* | 10/2010 | Cho | ....................... | G01S 5/0252 |
| | | | | 340/8.1 |
| 2011/0012743 A1* | 1/2011 | Van Gorp | ............. | G08C 17/02 |
| | | | | 340/686.6 |
| 2011/0143746 A1* | 6/2011 | Lehser | .................. | H04W 24/02 |
| | | | | 455/423 |
| 2013/0267257 A1* | 10/2013 | Palanki | ................. | H04W 4/029 |
| | | | | 455/456.5 |
| 2015/0082427 A1* | 3/2015 | Ivanchykhin | ........... | H04L 63/08 |
| | | | | 726/22 |
| 2015/0245311 A1* | 8/2015 | Wang | .................. | H04W 64/003 |
| | | | | 455/456.1 |
| 2015/0350862 A1* | 12/2015 | Baxley | .................... | H04W 4/90 |
| | | | | 455/404.2 |
| 2016/0084646 A1 | 3/2016 | Chen | | |
| 2016/0301539 A1* | 10/2016 | Lindoff | ................ | H04L 12/1881 |
| 2016/0309303 A1* | 10/2016 | Svener | .................. | G01S 5/0257 |
| 2016/0316338 A1* | 10/2016 | Li | ........................... | H04W 4/80 |
| 2017/0156119 A1* | 6/2017 | Neves | .................. | H04W 52/283 |
| 2017/0234962 A1* | 8/2017 | Yang | ...................... | G01S 5/0252 |
| | | | | 342/465 |
| 2017/0237986 A1* | 8/2017 | Choi | ...................... | H04B 1/385 |
| | | | | 348/14.02 |
| 2017/0374641 A1* | 12/2017 | Batra | .................... | H04B 17/27 |
| 2018/0007509 A1* | 1/2018 | Mei | ........................ | H04W 4/023 |
| 2018/0176771 A1* | 6/2018 | Yang | .................... | H04L 9/0819 |
| 2018/0196972 A1* | 7/2018 | Lu | ...................... | H04W 52/0274 |
| 2018/0199304 A1* | 7/2018 | Wilson | ............... | H04W 64/003 |

\* cited by examiner

AUTONOMOUS POSITIONING SYSTEMS

FIELD

The subject matter herein generally relates to autonomous positioning systems.

BACKGROUND

In the past, radio resources are scarce and trilateration was carried out in deterministic ways. Nowadays, due to proliferation of mobile wireless devices and fixed access points (APs), data needed to carry out trilateration can be collected easily. By using the sea amount of radio measurement data while mobile devices are moving around, more accurate assessment of the locations of those mobile devices relative to the stationary APs can become available, even without the client device users' awareness. Statistic means including averaging, mean square value, channel estimation, Kalman filter, fingerprinting, etc. will only increase the accuracy of the location assessment. Means of radio measurement may include signal strength, angle of arrival (triangulation), time or phase of arrival. Mixed use of these means, with appropriate inclusion of Probabilistic methods, will increase the accuracy.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
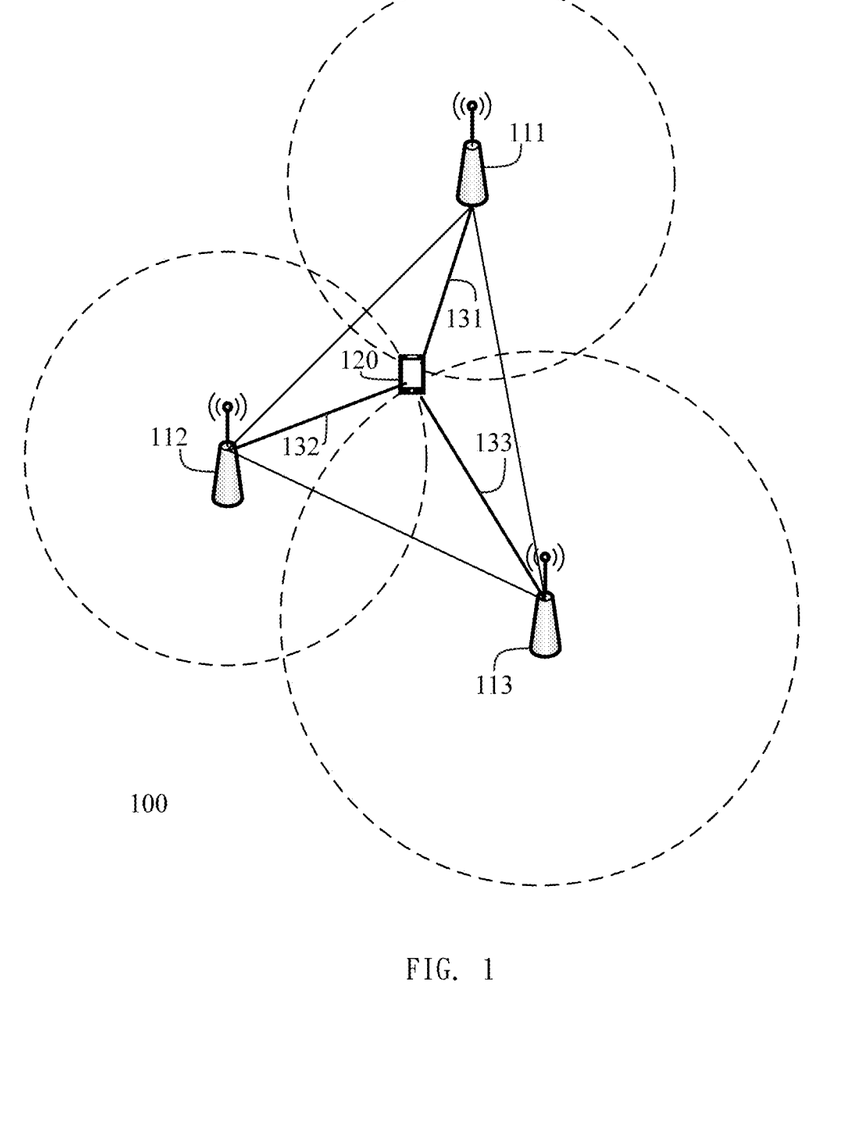
FIG. 1 illustrates trilateration of an autonomous positioning system according to an exemplary embodiment of the disclosure.

FIG. 1 illustrates trilateration of an autonomous positioning system according to an exemplary embodiment of the disclosure. In the past, radio resources are scarce and trilateration was carried out in deterministic ways. A mobile device or a stationary access points need to transmit the detected wireless signals to a positioning controller of the system. Nowadays, due to proliferation of mobile wireless devices and fixed access points (APs), data needed to carry out trilateration can be collected easily. The results are transmitted to the mobile device or the stationary access points. An embodiment of the disclosure provides an autonomous positioning system for a mesh network comprising a plurality of access points. The following takes three access points as an example, but two or more access points can form a mesh network, and the relative position and distance relationship of different dimensions and precision are generated by the measurement of wireless signals. The first stationary access point, the second stationary access point and the third stationary access point generates a first transmitting signal, a second transmitting signal and a third transmitting signal, respectively. Two of the three stationary access points measure the received signal strength of the other party, and the distance between the two stationary access points can be obtained according to the physical formula of the wireless signal with distance fading. In this way, a triangle can be drawn according to the distance between the two stationary access points. Thus, map information indicating relative positions of the stationary access points is obtained. Since the map information is established without inputting the coordinates of a known fixed access point, it is therefore referred to as an autonomous positioning. As shown in FIG. 1, an autonomous positioning system 100 for a mesh network comprises a first stationary access point 111, a second stationary access point 112 and a third stationary access point 113. The mobile device 120 is coupled to the first stationary access point 111 of the mesh network. The mobile device 120 receives a first transmitting signal, a second transmitting signal and a third transmitting signal via the mesh network. The mobile device 120 obtains a first received signal strength indicator of the first transmitting signal, a second received signal strength indicator of the second transmitting signal, and a third received signal strength indicator of the third transmitting signal. Inertial positioning information is provided by the mobile device 120. The first stationary access point 111 transmits the first transmitting signal via the mesh network and receiving the first received signal strength indicator (RSSI1), the second received signal strength indicator (RSSI2) and the third received signal strength indicator (RSSI3). The first stationary access point 111 obtains first distance information 131 to the mobile device 120 according to the first received signal strength indicator (RSSI1), obtains second distance information 132 to the mobile device 120 according to the second received signal strength indicator (RSSI2), and obtains third distance information 133 to the mobile device 120 according to the third received signal strength indicator (RSSI3). The second stationary access point 112 transmits the second transmitting signal via the mesh network. The third stationary access point 113 transmits the third transmitting signal via the mesh network. The first stationary access point 111, the second stationary access point 112 and the third stationary access point 113 transmits the first distance information 131, the second distance information 132 and the third distance information 133 to each other to make sure information in each access point in the mesh network synchronously. By using the trilateration method, the location information of the mobile device can be found on the map information of the mesh network.

Figure 2:
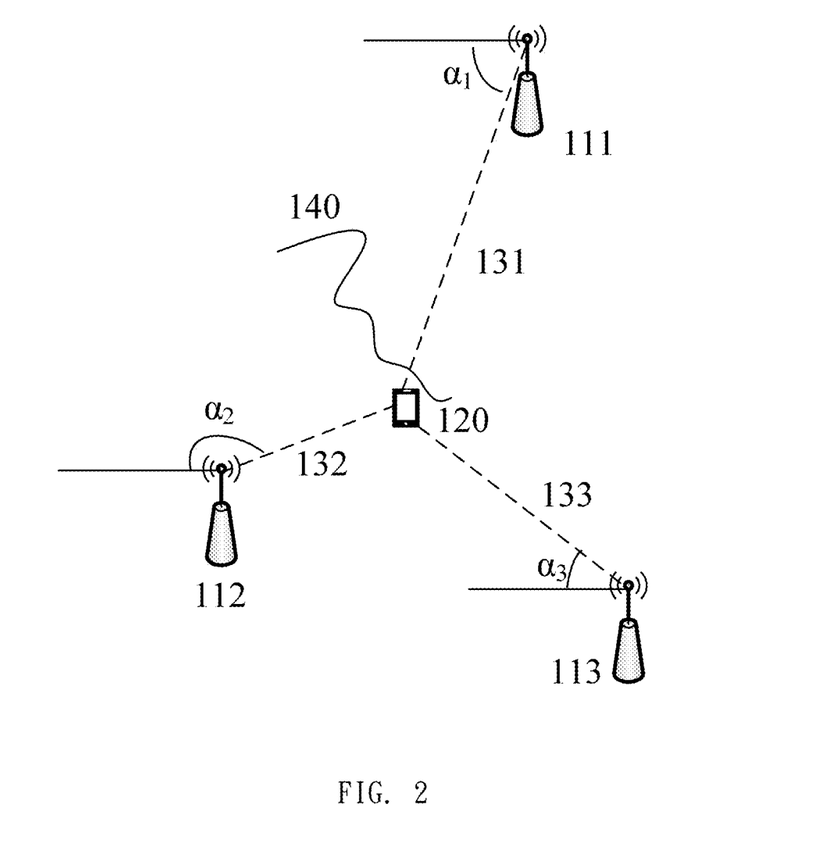
FIG. 2 illustrates angle of arrived in an autonomous positioning system according to an exemplary embodiment of the disclosure.

FIG. 2 illustrates angle of arrived in an autonomous positioning system according to an exemplary embodiment of the disclosure. By using a trilateration method, approximate relative locations among a plurality of radio stations can be found via solving quadratic equations. Received signal strength (RSSI) can be converted to the distance between the transmitter and the receiver according to the path loss model. In case some of the radio stations are stationary while others are mobile (such as in the case of a group of APs and another group of client devices to the APs), the signal strength measurements of the mobile clients fluctuate due to instabilities in antenna orientations and obstructions. Still, a probabilistic approach can be used to roughly estimate the signal strength, and the location, by trilateration. The more data are collected and the more frequently it is being measured, the more the accuracy of location is. As shown in FIG. 2, an autonomous positioning system for a mesh network comprises a first stationary access point 111, a second stationary access point 112 and a third stationary access point 113. The first stationary access point 111, the second stationary access point 112 and the third stationary access point 113 synchronizes time stamp. A mobile device 120 transmits a period measuring signal to the first stationary access point 111, the second stationary access point 112 and the third stationary access point 113, and the first stationary access point 111 generates the locate information according to time of arrived (ToA) of the period measuring signal to the first stationary access point 111, the second stationary access point 112 and the third stationary access point 113. The environment of the mesh network has a wall or an item blocks wireless signal causing a first distance information 131, a second distance information 132 and a third distance information 133 incorrect. A first angle of arrival $\alpha_1$ can equally make use of similar probabilistic method to increase the accuracy of the location of the mobile device 120.

Figure 3:
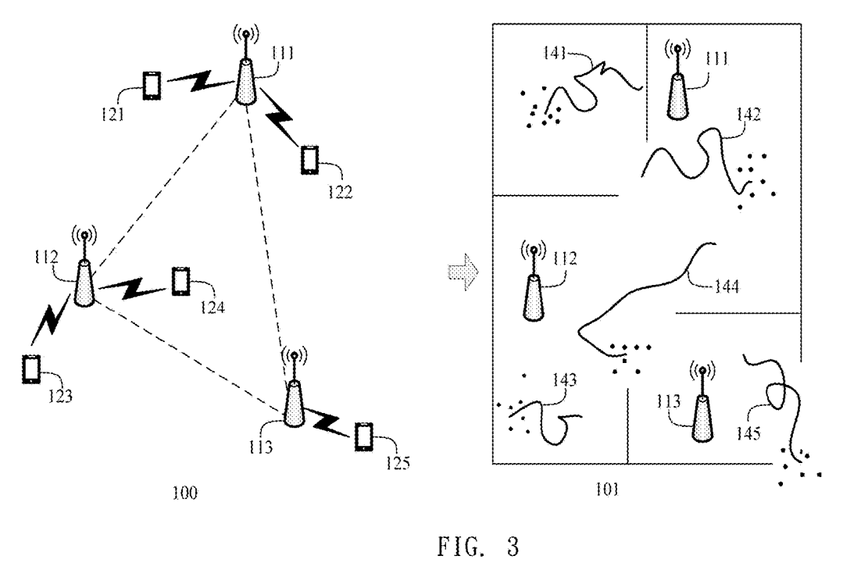
FIG. 3 illustrates map information of an autonomous positioning system according to an exemplary embodiment of the disclosure.

FIG. 3 illustrates map information of an autonomous positioning system according to an exemplary embodiment of the disclosure. Nowadays, due to proliferation of mobile wireless devices and stationary access points (APs), data needed to carry out trilateration can be collected easily. By using the sea amount of signal strength data while mobile devices are moving around, more accurate assessment of the locations of those mobile devices relative to the stationary APs can become available, even without the client device users' awareness. Statistic means including averaging, mean square value, channel estimation, etc. will only increase the accuracy of the location assessment. Other means of radio positioning including angle of arrival (triangulation), time or phase of arrival, can equally make use of similar probabilistic method, to increase the accuracy. As shown in FIG. 3, an autonomous positioning system for a mesh network comprises a first stationary access point 111, a second stationary access point 112, a third stationary access point 113 and a plurality of mobile devices couples to the mesh network wirelessly. A first mobile device 121 and a second mobile device 122 couples to the first stationary access point 111, a third mobile device 123 and a fourth mobile device 124 couples to the second stationary access point 112 and a fifth mobile device 125 couples to the third stationary access point 113. Location information of the first mobile device 121, the second mobile device 122, the third mobile device 123, the fourth mobile device 124 and the fifth mobile device 125 can be obtained according to the trilateration. The first mobile device 121, the second mobile device 122, the third mobile device 123, the fourth mobile device 124 and the fifth mobile device 125 provide inertial positioning information to the first stationary access point 111. The first stationary access point 111 generates a first moving path 141 of the first mobile devices 121, a second moving path 142 of the second mobile devices 122, a third moving path 143 of the third mobile devices 123, a fourth moving path 144 of the fourth mobile devices 124, a fifth moving path 145 of the fifth mobile devices 125 according to the inertial positioning information, and the map information 101 is generated according to the first moving path 141, the second moving path 142, the third moving path 143, the fourth moving path 144 and the fifth moving path 145.

An embodiment of the autonomous positioning system according to the disclosure further comprises a Bluetooth device transferring and receiving Bluetooth signals. The Bluetooth signals output from the Bluetooth device comprises information that sufficient to identify the identity of the Bluetooth device. The first Bluetooth node responds a first polling signal according to the Bluetooth signals, provides a first Bluetooth connector for the Bluetooth device connecting to the mesh network, and obtains a first distance to be measured according to the Bluetooth signals. The second Bluetooth node responds a second polling signal according to the Bluetooth signals, provides a second Bluetooth connector for the Bluetooth device connecting to the mesh network, and obtains a second distance to be measured according to the Bluetooth signals. The third Bluetooth node responds a third polling signal according to the Bluetooth signals, provides a third Bluetooth connector for the Bluetooth device connecting to the mesh network, and obtains a third distance to be measured according to the Bluetooth signals. The first Bluetooth node obtains a position of the Bluetooth device according to the first distance, the second distance and the third distance. In the embodiments of the disclosure, the first Bluetooth connector, the second Bluetooth connector and the third Bluetooth connector can be connected to the mesh network by wires or wirelessly. In the embodiment of wired connection, the location of the first Bluetooth node, second Bluetooth node and third Bluetooth node can be determined as the location of the Bluetooth nodes connected to the mesh network, with an error of the cable length. In the embodiment of wirelessly connection, the first Bluetooth node, the second Bluetooth node and the third Bluetooth node are served as Bluetooth to WiFi bridges, and the location of the Bluetooth nodes can be determined as the location of the Bluetooth to WiFi bridges connected to the mesh network. Thus, the Bluetooth device in the mesh network can be determined according to the location of the Bluetooth nodes connected to the mesh network. In other embodiments, since the Bluetooth signals output from the Bluetooth device comprises information that sufficient to identify the identity of the first Bluetooth device, the location of the Bluetooth device can be determined according to the Bluetooth signals, with the error of the Bluetooth radio link distance.

In the embodiments of the disclosure, the location of the Bluetooth device can be determined by the first Bluetooth node, the second Bluetooth node and the third Bluetooth node with known locations. The first Bluetooth node, the second Bluetooth node or the third Bluetooth node can collect the RSSI of the first polling signal, the second polling signal and the third polling signal, and obtains the location of the Bluetooth device by trilateration method using the polling signals. Thus, the approximate location of the Bluetooth device is found in the map information of the mesh network.

Figure 4:
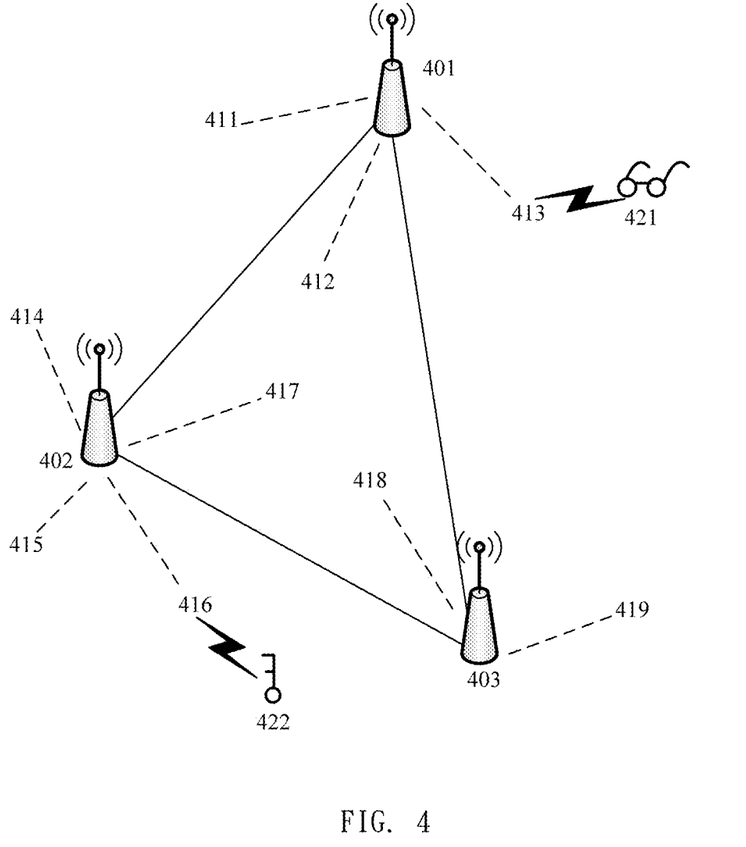
FIG. 4 illustrates an autonomous positioning system with Bluetooth according to an exemplary embodiment of the disclosure.

FIG. 4 illustrates an autonomous positioning system with Bluetooth according to an exemplary embodiment of the disclosure. When the Bluetooth node is wired to a stationary access point, the location of the Bluetooth node is the connected location. As shown in FIG. 4, the mesh network comprises first stationary access point 401, second stationary access point 402 and third stationary access point 403. Bluetooth nodes 411-413 are connected to first stationary access point 401, Bluetooth nodes 414-417 are connected to second stationary access point 402, and Bluetooth nodes 418 and 419 are connected to third stationary access point 403. When the Bluetooth node is connected to a stationary access point wirelessly, the Bluetooth device transferring and receiving Bluetooth polling signals. In an embodiment, the first Bluetooth device 421 is a Bluetooth glasses, and the second Bluetooth device 422 is a key. Bluetooth nodes 411-419 respond polling signals according to the Bluetooth signals from the Bluetooth devices 421 or 422, and provide Bluetooth connectors for the Bluetooth device 421 or 422 connecting to the mesh network. When the Bluetooth device 421 is connected to Bluetooth node 413, the Bluetooth device 421 is determined to be adjacent to first stationary access point 401. When the Bluetooth device 422 is connected to Bluetooth node 416, the Bluetooth device 422 is determined to be adjacent to second stationary access point 402. In other embodiment, the polling signals from three Bluetooth nodes can be used to obtain the location of the Bluetooth device by trilateration method using the polling signals. Since the effective transmission distance of Bluetooth is much smaller than the effective transmission distance of Wi-Fi, a more accurate positioning position can be obtained through the polling signals responded from the Bluetooth device. In the embodiments of the disclosure, the location of the Bluetooth device can be determined by the first Bluetooth node, the second Bluetooth node and the third Bluetooth node with known locations. The first Bluetooth node, the second Bluetooth node or the third Bluetooth node can collect the RSSI of the first polling signal, the second polling signal and the third polling signal, and obtains the location of the Bluetooth device by trilateration method using the polling signals. Thus, the approximate location of the Bluetooth device is found in the map information of the mesh network. The first Bluetooth node responds a first polling signal according to the Bluetooth signals and obtains a first distance to be measured according to the RSSI of the Bluetooth signals. The second Bluetooth node responds a second polling signal according to the Bluetooth signals and obtains a second distance to be measured according to the RSSI of the Bluetooth signals. The third Bluetooth node responds a third polling signal according to the Bluetooth signals and obtains a third distance to be measured according to the RSSI of the Bluetooth signals. The location information on the map information of the mesh network of the Bluetooth device can be found according to the first distance, the second distance and the third distance. Since the effective transmission distance of the Bluetooth device is 1-4 meters, the accuracy of the indoor positioning can be effectively improved compared with the trilateration method by the stationary access point. Thus, the first stationary access point 401 generates the map information according to the position of the Bluetooth device.

According to the embodiments of the disclosure, the stationary access point provides an unencrypted fake service setting identification code (SSID), and determines whether a strange device appears according to a physical address of a connected device connecting to the mesh network using the unencrypted fake service setting identification code (SSID) and an authorized list. If the strange device is detected announces a warning alert to user. The location of the strange device can be located by the autonomous positioning method of this invention.

Figure 5:
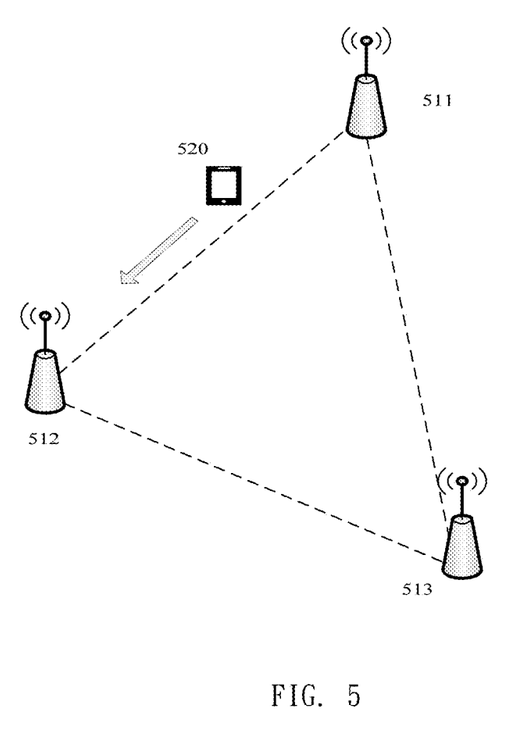
FIG. 5 illustrates fast roaming in a mesh network according to an exemplary embodiment of the disclosure.

FIG. 5 illustrates fast roaming in a mesh network according to an exemplary embodiment of the disclosure. In a typical Wi-Fi mesh network scenario, the SSIDs and passwords of those mesh APs are usually set the same. This way a mobile device can associate with any, usually the strongest, Wi-Fi signal while maintaining only one set of SSID and password. When a mobile device is roaming among a group of mesh APs, a decision must be made to switch to the closest AP or an AP with the strongest signal. However if there are multiple APs with same SSID, the mobile radio station may still try to associate with to the AP it links to when the signal level is still above the threshold, even if it is told to disassociate or the AP it links to de-authorizes its connection. As shown in FIG. 5, a mobile device 520 coupled to the mesh network wirelessly. The mobile device 520 receives a first transmitting signal from a first stationary access point 511, a second transmitting signal from a second stationary access point 512 and a third transmitting signal from a third stationary access point 513. The mobile device 520 obtains a first received signal strength indicator of the first transmitting signal, a second received signal strength indicator of the second transmitting signal, and a third received signal strength indicator of the third transmitting signal. The mobile device 520 is coupled to the first stationary access point 511 wirelessly, and with moving of the mobile device 520, the first stationary access point 511 obtains the first received signal strength indicator, the second received signal strength indicator and the third received signal strength indicator. The first stationary access point 511 transmits a switch instruction to the mobile device 520 when the second received signal strength indicator exceeds the first received signal strength indicator, the switch instruction comprises a physical address of the second stationary access point 512, and the mobile device 520 reconnects the second stationary access point 512 using the physical address of the second stationary access point 512 according to the switch instruction. In this way reduces retry (linked to the first stationary access point again) and avoids the time of error linked with other stationary access point. That is why can be performed quickly in this method.

The autonomous positioning system and method proposed by the invention completes the sea mount data computing work in the mesh network by using a stationary access point in a decentralized manner, thereby eliminating the data transmission of the round-trip positioning controller and the centralized computing burden. It not only improves the convenience of wireless sensing network transmission, but also reduces the cost of wireless sensing network deployment, and takes advantage of the multi-point positioning of the mesh network, calculating the relative distance between the devices and the moving track. The location map is generated achieve the effect of anti-theft warning by identifying and locating strange devices. The WiFi network combines with the Bluetooth network to help users to locate more accurately and find the items they are looking for more quickly.

The fast roaming of the mesh network system and method reduces the time to re-try (to associate with AP1 again) and avoid mistakenly associating to other APs thus the handover can be carried out promptly.

According to the embodiments of the disclosure, the user can quickly create the indoor mapping and coordinates according to the engagement relationship among the smart floor tiles. In addition, the environmental information can be collected and the location of a user walking on the tiles can be sensed, and a specific multimedia effect can be provided.

Many details are often found in the art such as the other features of smart floor tiles. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An autonomous positioning system for a mesh network, comprising:
    a mobile device coupled to the mesh network wirelessly, receiving a first transmitting signal, a second transmitting signal and a third transmitting signal via the mesh network, obtaining a first received signal strength indicator of the first transmitting signal, a second received signal strength indicator of the second transmitting signal, and a third received signal strength indicator of the third transmitting signal, and providing inertial positioning information and displaying map information of the mesh network;
    a first stationary access point transmitting the first transmitting signal via the mesh network and receiving the first received signal strength indicator, the second received signal strength indicator and the third received signal strength indicator from the mobile device, wherein the first stationary access point obtains first distance information according to the first received signal strength indicator, obtains second distance information according to the second received signal strength indicator, obtains third distance information according to the third received signal strength indicator, and obtains a position of the mobile device according to the first distance information, the second distance information and the third distance information;
    a second stationary access point transmitting the second transmitting signal via the mesh network;
    a third stationary access point transmitting the third transmitting signal via the mesh network; and
the first stationary access point generates a moving path of the mobile device according to the inertial positioning information, and the map information is generated according to the moving path of the mobile device, wherein the mobile device is coupled to the first stationary access point wirelessly, and with moving of the mobile device, the first stationary access point obtains the first received signal strength indicator, the second received signal strength indicator and the third received signal strength indicator, wherein the first stationary access point transmits a switch instruction to the mobile device when the second received signal strength indicator exceeds the first received signal strength indicator, the switch instruction comprises a physical address of the second stationary access point, and the mobile device reconnects the second stationary access point using the physical address of the second stationary access point according to the switch instruction.

2. The autonomous positioning system of claim 1, wherein the mobile device transmits a period measuring signal to the first stationary access point, the second stationary access point and the third stationary access point, and the first stationary access point generates the locate information according to time of arrived (ToA) of the period measuring signal to the first stationary access point, the second stationary access point and the third stationary access point.

3. The autonomous positioning system of claim 2, further comprising:
    a first Bluetooth device transferring and receiving Bluetooth signals; and
    a first Bluetooth node responding a first polling signal according to the Bluetooth signals, providing a first Bluetooth connector for the first Bluetooth device connecting to the mesh network, and obtaining a first distance to be measured according to the Bluetooth received signal strength indicator;
    a second Bluetooth node responding a second polling signal according to the Bluetooth signals, providing a second Bluetooth connector for the first Bluetooth device connecting to the mesh network, and obtaining a second distance to be measured according to the Bluetooth received signal strength indicator; and
    a third Bluetooth node responding a third polling signal according to the Bluetooth signals, providing a third Bluetooth connector for the first Bluetooth device connecting to the mesh network, and obtaining a third distance to be measured according to the Bluetooth received signal strength indicator, wherein the first Bluetooth node obtains a position of the first Bluetooth device according to the first distance, the second distance and the third distance.

4. The autonomous positioning system of claim 3, wherein the first stationary access point generates the map information according to the position of the first Bluetooth device.

5. The autonomous positioning system of claim 2, further comprising:
    a fourth Bluetooth node providing a fourth Bluetooth connector;
    a second Bluetooth device connect to the fourth Bluetooth connector; and
    the map information showing the second Bluetooth device according to the location of the fourth Bluetooth connector.

6. The autonomous positioning system of claim 1, wherein the first stationary access point comprises a plurality of antennas, and generates the locate information according to angle of arrived (AoA) of the signals received from the mobile device corresponding to the antennas.

7. The autonomous positioning system of claim 1, wherein the first stationary access point provides an unencrypted fake service setting identification code (SSID), and determines whether a strange device appears according to a physical address of a connected device connecting to the mesh network using the unencrypted fake service setting identification code (SSID) and an authorized list.

* * * * *